(12) United States Patent
Kreutzer et al.

(10) Patent No.: US 6,595,669 B2
(45) Date of Patent: Jul. 22, 2003

(54) VEHICULAR WARNING LIGHT HAVING LESS APPARENT COLOR WHEN NOT ENERGIZED

(75) Inventors: Robert E. Kreutzer, Columbia, IL (US); Dennis A. Dohogne, St. Peters, MO (US); Paul L. Stein, St. Peters, MO (US); Kelly J. Kyriakos, St. Louis, MO (US); Michael W. Tobin, Wildwood, MO (US)

(73) Assignee: Code 3, Inc., St. Louis, MO (US)

( * ) Notice: Subject to any disclaimer, the term of this patent is extended or adjusted under 35 U.S.C. 154(b) by 0 days.

(21) Appl. No.: 10/044,793

(22) Filed: Nov. 9, 2001

(65) Prior Publication Data

US 2002/0126488 A1 Sep. 12, 2002

Related U.S. Application Data

(63) Continuation-in-part of application No. 09/431,327, filed on Nov. 2, 1999, now Pat. No. 6,461,022.
(60) Provisional application No. 60/247,384, filed on Nov. 9, 2000, and provisional application No. 60/106,705, filed on Nov. 2, 1998.

(51) Int. Cl.[7] .................................................. B60Q 1/26
(52) U.S. Cl. ........................ 362/493; 362/293; 362/510; 362/307; 340/815.47
(58) Field of Search ............................ 362/293, 493, 362/231, 240, 509, 510, 540, 543, 542, 255, 256, 307; 340/815.45, 815.47, 472, 471

(56) References Cited

U.S. PATENT DOCUMENTS

| 3,586,851 A | 6/1971 | Rudolph |
| 3,818,216 A | 6/1974 | Larraburu |
| 4,482,942 A | 11/1984 | Blaisdell et al. |
| 4,488,207 A | 12/1984 | Harmon |
| 4,602,321 A | 7/1986 | Bornhorst |
| 4,620,791 A | 11/1986 | Combastet |
| 4,800,474 A | 1/1989 | Bornhorst |
| 4,836,649 A | 6/1989 | Ledebuhr et al. |
| 4,897,770 A | 1/1990 | Solomon |
| 4,933,751 A | 6/1990 | Shinonaga et al. |
| 4,958,265 A | 9/1990 | Solomon |
| 4,974,136 A | 11/1990 | Noori-Shad et al. |
| 4,996,632 A | 2/1991 | Aikens |
| 5,014,167 A | 5/1991 | Roberts |
| 5,031,078 A | 7/1991 | Bornhorst |
| 5,060,126 A | 10/1991 | Tyler et al. |
| 5,071,225 A | 12/1991 | Inoue |
| 5,073,847 A | 12/1991 | Bornhorst |
| 5,096,280 A | 3/1992 | Hamada |
| 5,097,397 A * | 3/1992 | Stanuch et al. ............ 362/493 |
| 5,105,265 A | 4/1992 | Sato et al. |
| 5,177,396 A | 1/1993 | Gielen |
| 5,186,536 A | 2/1993 | Bornhorst et al. |
| 5,207,492 A | 5/1993 | Roberts |
| 5,361,190 A | 11/1994 | Roberts et al. |
| 5,414,603 A | 5/1995 | Conway |
| 5,426,576 A | 6/1995 | Hewlett |
| 5,452,188 A | 9/1995 | Green et al. |
| 5,481,409 A | 1/1996 | Roberts |

(List continued on next page.)

*Primary Examiner*—Sandra O'Shea
*Assistant Examiner*—Hargobind S. Sawhney
(74) *Attorney, Agent, or Firm*—Senniger, Powers, Leavitt & Roedel

(57) ABSTRACT

The device includes a visible light source and a transmissive/reflective layer on a vehicle. The layer is between the source and an observer and transmits emergency warning signals of various colors to the observer. In addition, the layer reflects ambient light so that when the light source is not illuminated the appearance of the device is changed and the emergency warning colors, if any, of the device are masked.

26 Claims, 13 Drawing Sheets

(9 of 13 Drawing Sheet(s) Filed in Color)

U.S. PATENT DOCUMENTS

| | | |
|---|---|---|
| 5,597,231 A | 1/1997 | Rosset |
| 5,600,487 A | 2/1997 | Kiyomoto et al. |
| 5,648,870 A | 7/1997 | Mistutake |
| 5,681,104 A | 10/1997 | Chinniah et al. |
| 5,691,696 A | 11/1997 | Mazies et al. |
| 5,708,530 A | 1/1998 | Huang |
| 5,715,095 A | 2/1998 | Hiratsuka et al. |
| 5,752,215 A | 5/1998 | Zaaiman |
| 5,788,357 A | 8/1998 | Muth et al. |
| 5,790,329 A | 8/1998 | Klaus et al. |
| 5,803,579 A | 9/1998 | Turnbull et al. |
| 5,825,548 A | 10/1998 | Bornhorst et al. |
| 5,842,765 A | 12/1998 | Cassarly et al. |
| 5,882,107 A | 3/1999 | Bornhorst et al. |
| 5,892,588 A | 4/1999 | Asakawa et al. |
| 5,930,048 A | 7/1999 | Kaneko |
| 5,969,868 A | 10/1999 | Bornhorst et al. |
| 5,975,720 A | 11/1999 | Adkins |
| 5,997,154 A | 12/1999 | Cooper et al. |
| 6,053,623 A | 4/2000 | Jones et al. |
| 6,072,633 A | 6/2000 | Park et al. |
| 6,076,948 A | 6/2000 | Bukosky et al. |
| 6,081,191 A * | 6/2000 | Green et al. ............. 340/472 |
| 6,089,730 A | 7/2000 | Machii |
| 6,132,072 A | 10/2000 | Turnbull et al. |
| 6,147,806 A | 11/2000 | Park et al. |

* cited by examiner (A)  (B)  (C)  (D)  (E)  (F)

PRIOR ART                    PRIOR ART

BLUE LOW-OBSERVABLE TECHNOLOGY

BLUE CONVENTIONAL FILTERED TECHNOLOGY

RED LOW-OBSERVABLE TECHNOLOGY

RED CONVENTIONAL FILTERED TECHNOLOGY

VEHICULAR WARNING LIGHT HAVING LESS APPARENT COLOR WHEN NOT ENERGIZED

FIELD OF THE INVENTION

The invention generally relates to warning lights and, in particular, to emergency vehicle lighting, vehicle light bars, vehicle warning lights and other warning devices having a transmissive/reflective layer which masks the appearance of the device to an observer remote from the device. In particular, the layer reduces the appearance of the color of the warning devices to an observer when the device is inactive and reflecting ambient light. In the inactive mode, the device is less apparent as an emergency warning device than it would be without the layer because, in part, the emergency warning colors (e.g., red, blue, amber) of the device are masked by the layer and less prevalent. Thus, an observer looking at the device when it is not energized is less likely to know or less likely to be able to tell that the device will emit an emergency warning color such as red, blue or amber, when energized.

BACKGROUND OF THE INVENTION

Generally, light bars and other emergency warning light devices employ colored light or a combination of colored and white light to increase visibility of the devices when they are energized. Frequently, emergency warning devices are identified by observers by their color (e.g., red, blue or amber). In some cases, the colored light is generated by colored filters or other colored surfaces which present an emergency warning color which is apparent to an observer when the device is not illuminated. This can be a disadvantage, particularly in police vehicles, because such colors allow observers to easily recognize the vehicles. In certain situations when the devices are not illuminated and inactive, such vehicles are attempting to be inconspicuous and maintain a low profile appearance. For example, police tend to be more effective if they can move about in cars having light bars which are less noticeable. Therefore, there is a need for light bars and other emergency warning light devices which provide multi-color operation but which do not have an obvious multi-color appearance when the devices are not illuminated.

SUMMARY OF THE INVENTION

It is an object of this invention to provide an emergency warning light device which produces red, amber and/or blue warning signals when illuminated but which does not appear to be red, amber and/or blue when not illuminated thereby having the appearance when not illuminated of a color substantially different from the emergency warning colors produced when illuminated.

It is another object of this invention to provide a multi-colored emergency warning light device which has the appearance of silver, copper, gold, or other color which is less apparent than red, amber or blue, when not illuminated thereby masking any colored emergency surfaces which generate colored light signals when illuminated.

It is another object of this invention to provide an emergency warning light device which generates multi-colored emergency signals and which has a reduced appearance of color to an observer when the device is not illuminated as compared to when the device is illuminated.

It is an object of this invention to provide an emergency warning light device which generates blue, red or amber emergency warning signals and which is less apparent than red, blue or amber, to an observer so that the color of the warning signals which the surfaces of the device will generate is masked.

It is another object of this invention to provide an emergency warning light device which produces colored warning light signals and which has the appearance of gold, silver, purple, or other less apparent colored surfaces and/or images to an observer so that the device masks the colored surfaces of the device.

In one form, the invention comprises an emergency warning device for a vehicle for use with an observer remote from the vehicle for alerting the observer of the vehicle's position. A visible, colored light source is adapted to be mounted on the vehicle and is adapted to be selectively energized. The light source when energized generates visible, colored light creating colored warning signals which are capable of being viewed by the observer remote from the vehicle for alerting the observer of the vehicle's position. A transmissive/reflective layer is located between the light source and the observer. When the light source is energized, at least some of the visible light generated by the light source is transmitted through the layer to the observer. The transmitted light provides at least one of the colored warning light signals to the observer. When the light source is not energized, at least some ambient light impinging upon the layer is reflected by the layer toward the observer. The color of the transmitted light has a different wavelength range than the color of the reflected light such that the color of the reflected light makes it less apparent that the device generates colored warning signals.

In another form, the invention comprises an emergency warning device for a vehicle comprising a visible light source, a power supply circuit and a transmissive/reflective layer. The visible light source is adapted to be mounted on the vehicle. The power supply circuit selectively energizes the visible light source so that the visible light source when energized generates visible warning light signals which are capable of being viewed by observers remote from the vehicle for alerting the observers of the vehicle's position. The transmissive/reflective layer is located between the light source and the observer. The layer is adapted to transmit warning light signals of a first color to the observer when the light source is energized, and the layer adapted to reflect ambient light of a second color when the light source is not energized. The second color is different than the first color so that the layer has an appearance when the light source is not energized which is different from the warning light signals.

In another form, the invention is an emergency warning device for a vehicle comprising a visible light source adapted to be mounted on the vehicle, a power supply circuit for energizing the visible light source, and a transmissive/reflective layer. The visible light source when energized generates visible warning light signals which are capable of being viewed by observers remote from the vehicle for alerting the observers of the vehicle's position. The transmissive/reflective layer is positioned on the vehicle between the light source and the observer and has an appearance when the light source is not energized of a color substantially different from a color of the visible warning light signals generated by the light source and transmitted through the layer when the light source is energized.

In yet another form, the invention is an emergency warning device for a vehicle for use with an observer remote from the vehicle for alerting the observer of the vehicle's position. A visible light source is adapted to be mounted on the vehicle and adapted to be selectively energized, the light source when energized generating visible light creating warning signals which are capable of being viewed by the observer remote from the vehicle for alerting the observer of the vehicle's position. A transmissive/reflective layer is located between the light source and the observer. When the light source is energized, at least some of the visible light generated by the light source is transmitted through the layer to the observer. The transmitted light provides at least one of the warning light signals to the observer and presents a first image of the layer when viewed by the observer. When the light source is not energized, at least some ambient light impinging upon the layer is reflected by the layer toward the observer. The reflected light presents a second image of the layer when viewed by the observer. The transmissive/reflective layer is adapted to transmit and reflect light such that the second image of the layer (which is the image of the layer viewed by the observer when the light source is not energized) has less apparent warning colors to the observer than the first image of the layer (which is the image of the layer viewed by the observer when the light source is energized).

In another form, the invention is an emergency warning device for a vehicle for use with an observer remote from the vehicle for alerting the observer of the vehicle's position. A visible light source is adapted to be mounted on the vehicle and adapted to be selectively energized, the light source when energized generating visible light creating warning signals which are capable of being viewed by the observer remote from the vehicle for alerting the observer of the vehicle's position. A transmissive/reflective layer is located between the light source and the observer. When the light source is energized, at least some of the visible light generated by the light source is transmitted through the layer to the observer. The transmitted light provides at least one of the colored warning light signals to the observer. When the light source is not energized, at least some ambient light impinging upon the layer is reflected by the layer toward the observer. The transmissive/reflective layer is adapted to transmit and reflect light such that the color image which would be viewed by the observer of the device when the light source is not energized is less apparently a warning color to the observer as compared to the colored image which would be viewed by the observer of the device without the layer.

In another form, the invention is a light bar for use with a vehicle for use with an observer remote from the vehicle for alerting the observer of the vehicle's position. The light bar comprises an enclosure; mounting hardware for securing the enclosure to the vehicle; and two or more devices within the enclosure. Each device comprises a light source which is selectively energized; a reflector positioned adjacent the light source for forming a beam of light; and a transmissive/reflective layer positioned between the reflector and the observer to intersect the beam. The transmissive/reflective layer is adapted to transmit the beam and reflect ambient light such that the colored image which would be viewed by the observer of the device when the light source is not energized is less apparently a warning color to the observer as compared to the colored image which would be viewed by the observer of the device when the light source is not energized.

Other objects and features will be in part apparent and in part pointed out hereinafter.

BRIEF DESCRIPTION OF THE DRAWINGS

The patent contains drawings executed in color. Copies of this patent with color drawings will be provided by the U.S. Patent and Trademark Office upon request and payment of the necessary fee.

FIG. 10 is a horizontal cross sectional view of an emergency vehicle device including a collimator, light source, substrate and transmissive, reflective layer according to the invention.

FIG. 11 is a schematic chart illustrating the transmission and reflection of blue, green and red light of various wavelengths by the substrate and layer according to the invention.

Corresponding reference characters indicate corresponding parts throughout the drawings.

DETAILED DESCRIPTION OF PREFEERED EMBODIMENTS

Figure 1:
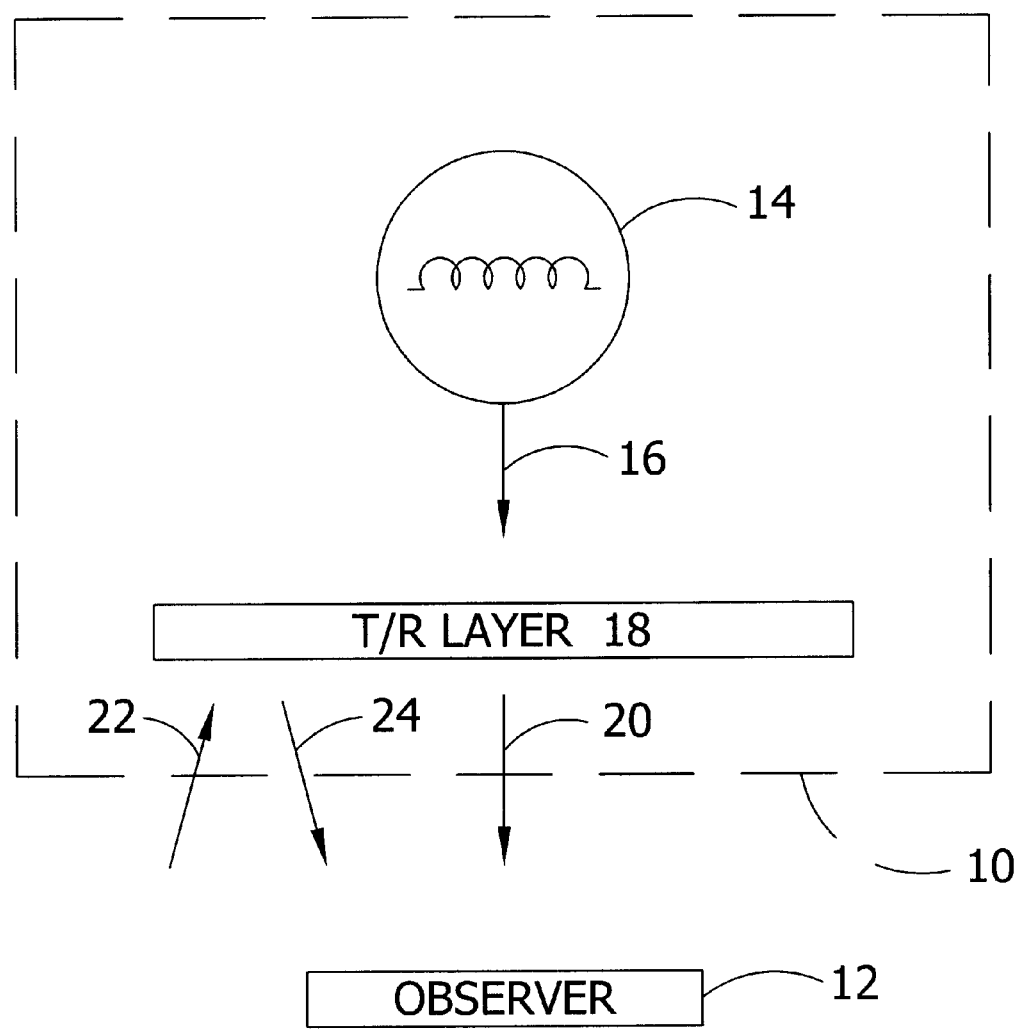
FIGS. 1–4 are schematic horizontal cross sectional views of devices of the invention.

FIGS. 1–4 provide a schematic overview of some of the preferred embodiments of the invention. In each of FIGS.

1–4, an emergency warning device 10 is illustrated. The device 10 is for a vehicle such as an emergency vehicle (e.g., police, fire, rescue or ambulance vehicles; not shown) for use with an observer 12 remote from the vehicle. The device 10 alerts the observer of the vehicle's position. The device 10 comprises a visible light source 14 adapted to be mounted on the vehicle and adapted to be selectively energized by a power supply. When energized, the light source generates visible light 16 creating warning signals which are capable of being viewed by the observer 12 remote from the vehicle for alerting the observer of the device and, thus, the vehicle's position. The device further comprises a transmissive/reflective layer 18 located between the light source 14 and the observer 12. When the light source 14 is energized, at least some of the visible light 16 generated by the light source is transmitted through the layer 18 to the observer 12 to form transmitted light 20. Thus, the transmitted light 20 provides at least one of the warning light signals to the observer and presents a first image of the layer 18 when viewed by the observer 12. When the light source 14 is not energized, at least some ambient light 22 impinging upon the layer 18 is reflected by the layer 18 toward the observer 12 to form reflected light 24. The reflected light 24 presents a second image of the layer 18 when viewed by the observer 12. The transmissive/reflective layer 18 is adapted to transmit and reflect light (e.g., transmitted light 20 and reflected light 24) such that the second image of the layer 18 (which is the image of the layer 18 viewed by the observer 12 when the light source 14 is not energized) is less apparent to the observer 12 than the first image of the layer 18 (which is the image of the layer 18 viewed by the observer 12 when the light source 14 is energized).

In one form of the invention, the color of the transmitted light 20 has a different wavelength range than the color of the reflected light 24 such that the color of the reflected light 24 (with the device not energized) does not reveal what color the transmitted light 20 will be when the device 10 is energized. Thus, the reflected light 24 makes the device 10 less apparent to the observer 12 as an emergency warning device than the device would be without the layer 18.

Figure 2:
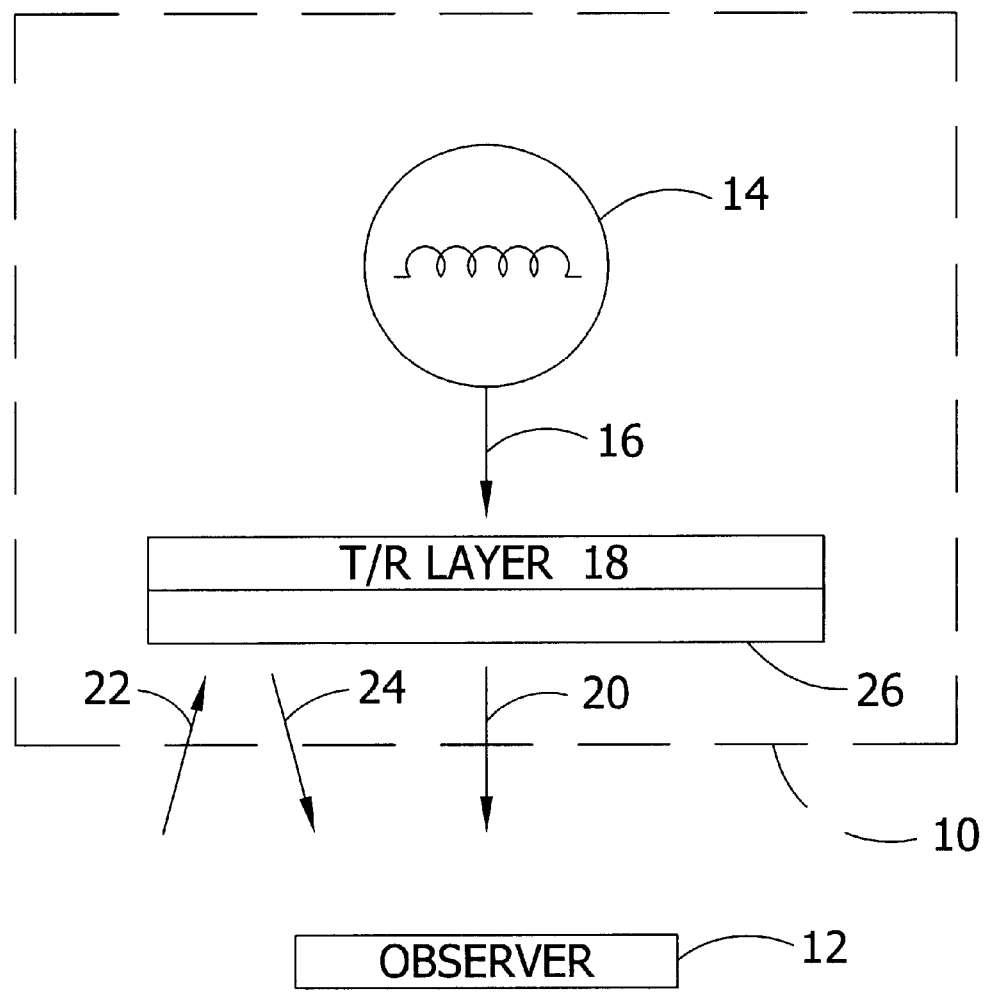
Figure 3:
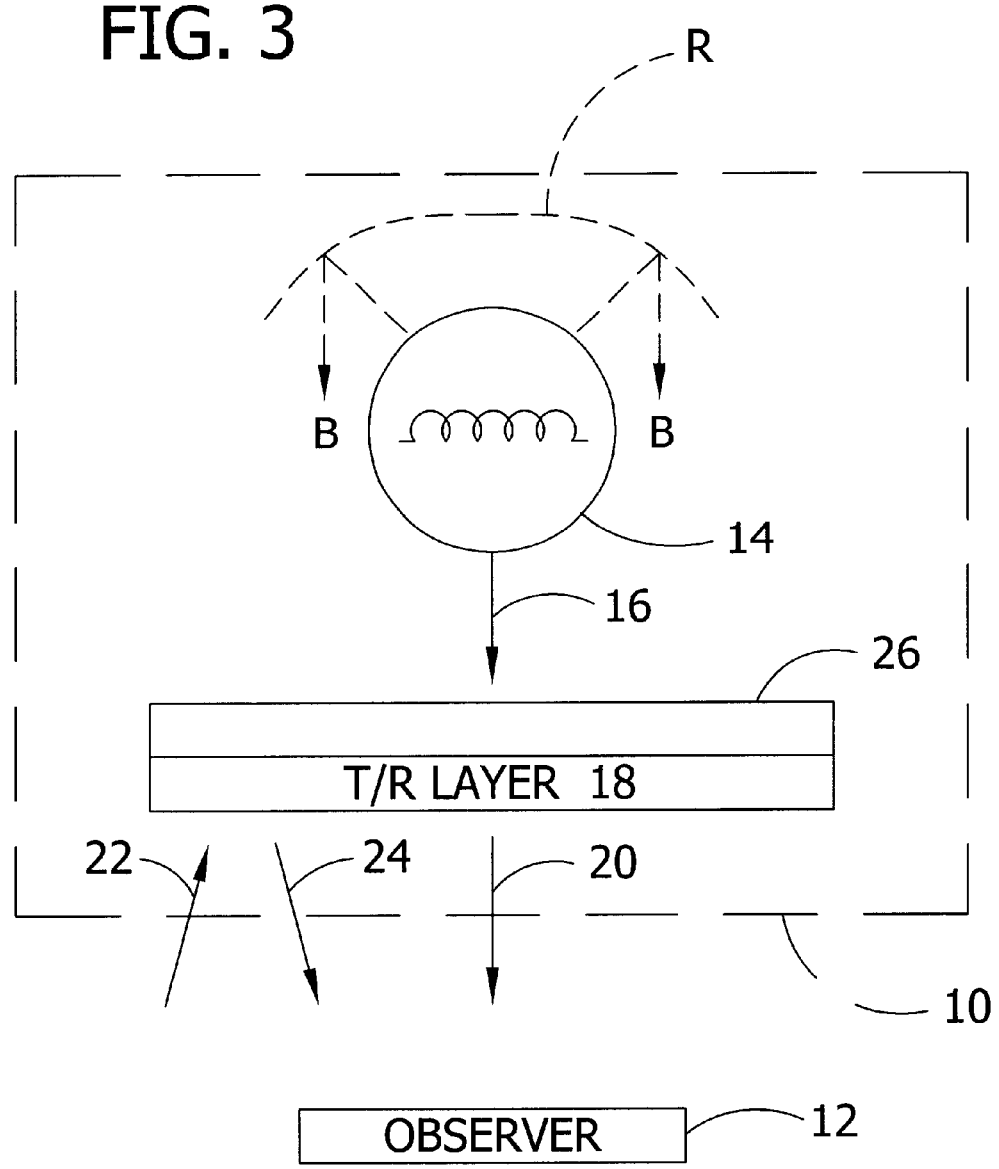
Figure 4:
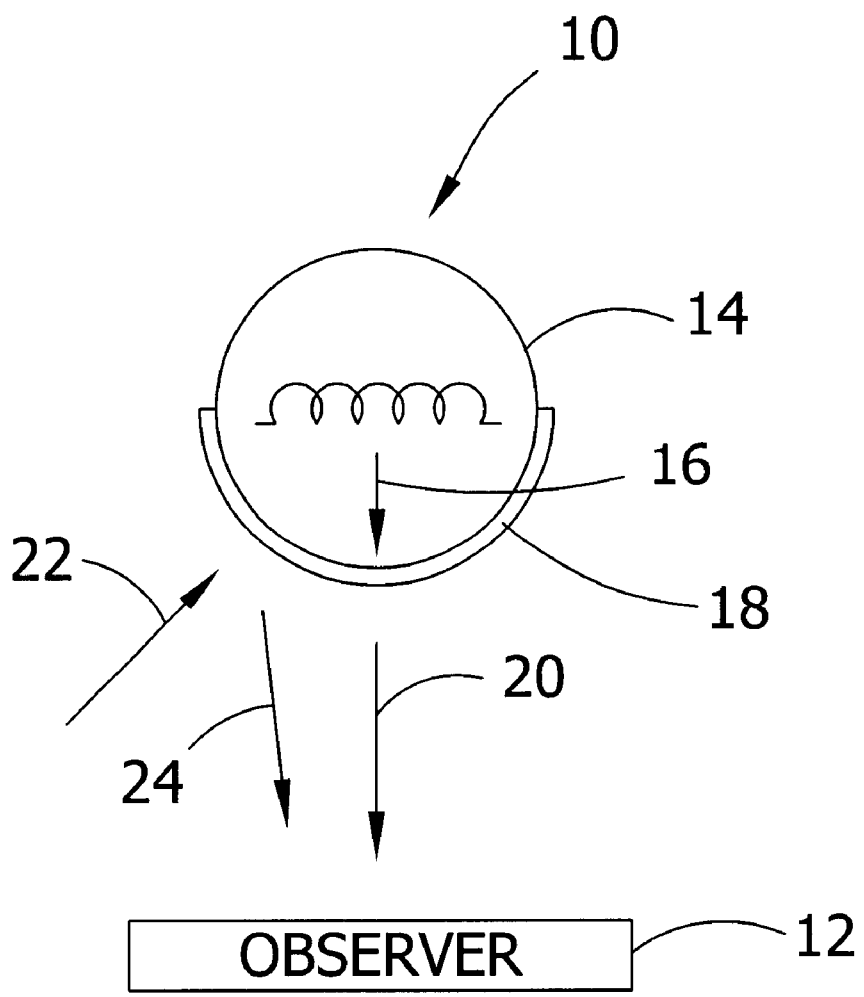

FIG. 1 is a more general form of preferred embodiments with FIGS. 2–4 illustrating various preferred embodiments of the invention which are a variation of FIG. 1. In FIGS. 2 and 3, the layer 18 is applied to a substrate 26. As illustrated, the layer 18 may be applied to either side of the substrate 18. For example, if the source 14 is a colored lamp generating colored light (e.g., red, blue, or amber) and if the layer 18 is a dichroic layer (e.g., transmitting red, blue, or amber, respectively), substrate 26 may be clear and the dichroic layer 18 may be applied to either side of the substrate 26 to mask the color of the lamp. By specifying "colored" lamp, or "colored" light or "color," it means that the lamp has a color to it, that the light has a color and is not substantially white, or that the color is not substantially white or substantially black.

As another example, the glass envelope or the light source 14 may be clear or a dyed glass such as red or amber bulb which can be coated with the layer 18 or covered with a sleeve having the layer 18 thereon.

As another example, if the source 14 is a clear lamp generating substantially white light and the substrate 26 is an absorptive filter (e.g., absorbing all light except red, blue or amber), the layer 18 may be applied to the side of the substrate 26 facing the observer 12 as shown in FIG. 3 so that the layer 18 is between the observer 12 and the source of the colored light. In this latter example, the filter may be considered part of the light source.

It is also contemplated that the source 14 may be a clear lamp and that the layer 18 may be applied to either side of the substrate 26 (see FIGS. 2 and 3) to mask the clear lamp. It is also contemplated that the device may be rotated and have a beam forming element such as a mirror or reflector R (see FIG. 3). It is also contemplated that the source 14 may be a colored lamp and that the layer 18 may be applied directly to the lamp (see FIG. 4) to mask the colored lamp. It is also contemplated that the source 14 may be a clear lamp and that the layer 18 may be applied directly to the lamp (see FIG. 4) to mask the clear lamp. Those skilled in the art will recognize other combinations and examples according to the invention to mask the emergency device.

The invention may be referred to as "low-observable technology". Low-observable technology devices have a direct visual benefit to emergency response officers because such devices have less-apparent color when not energized, as will be pointed out below. The officers can remain undetected longer with low-observable technology devices than with conventional coloring technology. This lower observability of the officers directly relates to a benefit of enhanced safety and security of the officer and therefore of the general public.

In one preferred embodiment, a dichroic coating may be used as the transmissive/reflective layer 18 in devices of the invention to achieve appropriate emergency warning color signals when the light sources of the devices are energized, yet the dichroic coating and thus the devices remain virtually hidden when not energized. The following discussion will relate to the use of a dichroic coating as the layer 18. However, it is contemplated and those in the art will recognize that other layers or coatings, such as ceramic coatings, may be used in place of or in addition to the dichroic coating.

Figure 5:
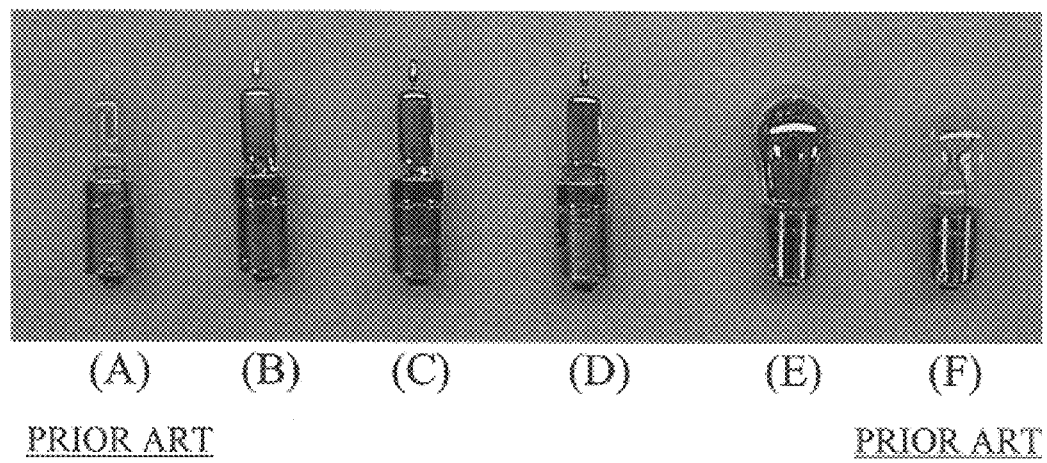
FIG. 5 is a photograph of uncoated bulbs (A) and (F) and coated bulbs (B), (C), (D) and (E).

As illustrated in FIG. 4, the layer 18 may be applied directly to a light source such as a bulb. FIG. 5 is a photograph of uncoated incandescent bulbs (A) and (F) and coated incandescent bulbs (B), (C), (D) and (E). In particular, bulb (A) is an uncoated, clear halogen lamp, bulb (B) is a dichroic-coated halogen lamp that transmits blue, bulb (C) is a dichroic coated halogen lamp that transmits red, bulb (D) is a dichroic-coated halogen lamp that transmits amber (yellow), bulb (E) is a dichroic coated tungsten lamp that transmits red, and bulb (F) is an uncoated, clear tungsten lamp. The coatings reflect a significant portion of the ambient light and do not have a definite color of their own. The dichroic-coated lamps (B)–(E) have a metallic reflective appearance when un-energized, as illustrated in FIG. 5, and generally look like the variable non-descript coloring of soap bubbles. This appearance reduces the likelihood of an observer identifying the device as an emergency warning device when the device is not energized.

Figure 6A:
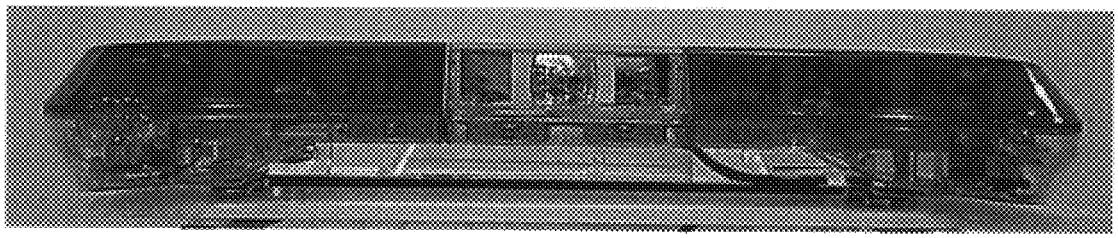
FIGS. 6A and 6B are photographs of prior art light bars.
Figure 6B:
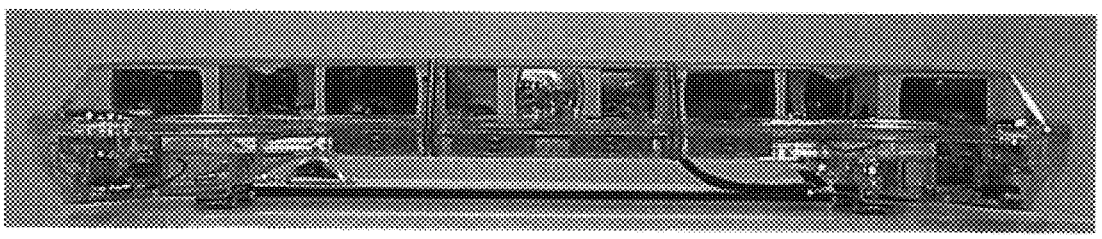
Figure 6C:
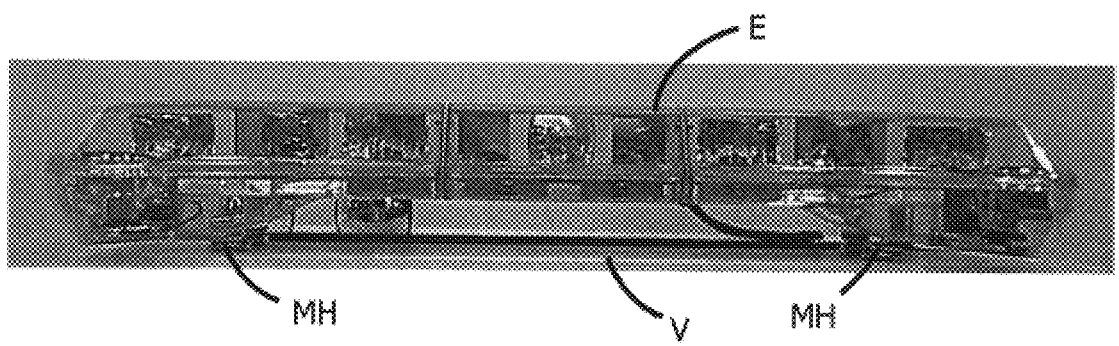
FIG. 6C is a photograph of a light bar employing devices according to the invention.

Conventional coloring technology utilizes absorptive filters via translucent pigmented plastics. For emergency warning products a police light bar, for instance, will often use this technology in the outer covering, or lens, as shown in FIG. 6A, which is a photograph of a prior art light bar. Another form of this conventional technology is shown in FIG. 6B, which is another photograph of a prior art light bar where the colors are applied to intermediate plastic filters that are in close proximity or attached to a rotating (or stationary) reflector underneath clear outer lenses. By comparison, the low-observable technology lights of the invention do not need or use intermediate filters or colored outer lenses to achieve their color. When energized, the color is achieved by the selective transmission by layer 18 of certain wavelengths of light in the visible spectrum. When not energized, the lack of emergency signal color is achieved by the partial reflection by layer 18 of light in the visible spectrum. A light bar equipped with low-observable technology devices according to the invention is shown in FIG. 6C. In particular, FIG. 6C includes the following devices: rotators, mirrors and intersection lights (although any emergency device such as oscillators or alley lights or any other lighting device may be employed).

FIG. 6C illustrates a light bar according to the invention for use with a vehicle V for use with an observer remote from the vehicle for alerting the observer of the vehicle's position. The light bar includes a transparent or translucent enclosure E, mounting hardware MH for securing the enclosure E to the vehicle V; and one or more devices D within the enclosure E. Each device is configured as illustrated in FIG. 3 including a light source 14 which is selectively energized, a reflector R positioned adjacent the light source for forming a beam B of light, and a transmissive/reflective layer 18, such as a dichroic coating on substrate 26. The layer 18 is positioned between the reflector R and the observer 12 to intersect the beam B. The transmissive/reflective layer 18 is adapted to transmit the beam B and reflect ambient light 22 such that the image presented by the reflected ambient light 24 which would be viewed by the observer 12 of the device 10 when the light source 14 is not energized makes it less apparent to the observer 12 that the device is an emergency warning device, as compared to the image of the beam B of colored, emergency light signals which would be viewed by the observer of the device 10 when the light source 14 is energized. Thus, as another example of a feature of some embodiments of the invention, as shown in FIG. 6C, the unenergized device 10 of the invention hides the colors of the emergency warning signals that will be provided when the device is energized.

It is noted that the low-observable technology light bar of FIG. 6C has substantially no apparent emergency colors, especially as compared to the other two light bars employing conventional coloring technology as shown in FIGS. 6A and 6B. This exemplifies one advantage of some embodiments of the low-observable technology devices of the invention.

Figure 7A:
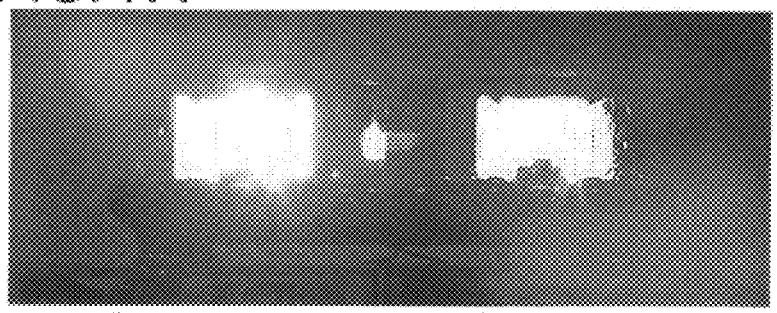
FIG. 7A is a photograph of an illuminated device of the invention employing blue low-observable technology.
Figure 7B:
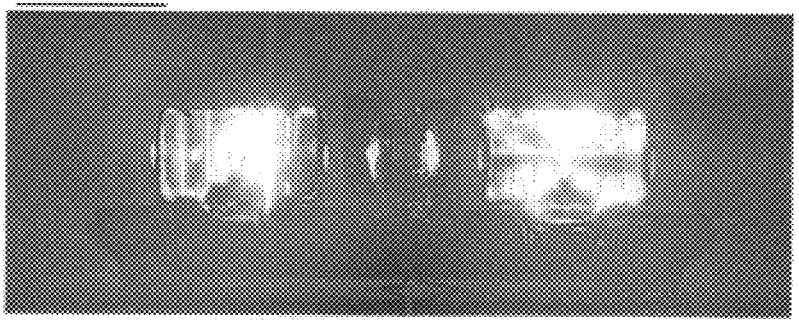
FIG. 7B is a photograph of an illuminated device of the prior art employing blue conventional filtered technology.
Figure 7C:
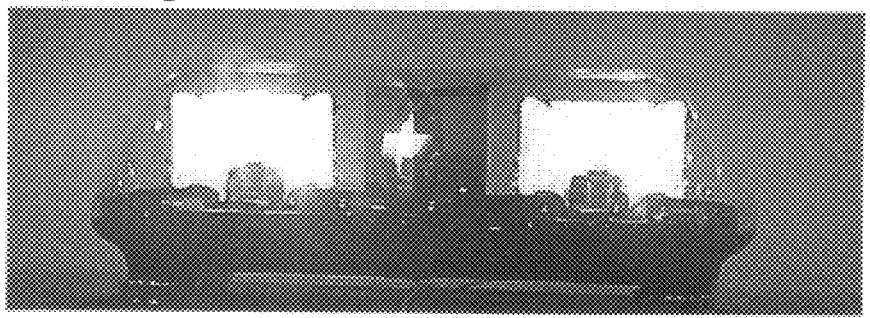
FIG. 7C is a photograph of an illuminated device of the invention employing red low-observable technology.
Figure 7D:
FIG. 7D is a photograph of an illuminated device of the prior art employing red conventional filtered technology.

As shown in FIGS. 7A–7D, when energized, the low-observable technology lights and conventional coloring technology produce similar results, e.g., red or blue emergency warning signals that attract the attention of persons in the area. FIG. 7A is a photograph of an illuminated device of the invention employing blue low-observable technology. FIG. 7B is a photograph of an illuminated device of the prior art employing blue conventional filtered technology. FIG. 7C is a photograph of an illuminated device of the invention employing red low-observable technology. FIG. 7D is a photograph of an illuminated device of the prior art employing red conventional filtered technology.

The above pictures of a two-rotator device in FIGS. 7A–7D demonstrate the general color nature of both conventional and low-observable technologies. The color differences shown between the low-observable technology of FIGS. 7A and 7C as compared to their corresponding conventional filtered technology of FIGS. 7B and 7D, respectively, is in large part a result of the photographic technique used to take the pictures.

In general, certified measuring equipment and industry standard methods are used to measure the color of the emitted signals. Achievement of colors that pass the appropriate industry specifications is a general capability of both conventional coloring technology and of low-observable technology technology. Industry color specifications state that the color requirements apply to the overall effective color of light emitted by the device in any given direction and not to the color of the light from a small area of the lens. Specifications also state that the color shall be that of the emitted light, not that of the material used for the lens or filter.

Low-observable technology lights can be achieved in several preferred embodiments. In one preferred embodiment, dichroic coatings are applied directly to the lamp surfaces such as the halogen and tungsten bulbs shown above (see FIG. 5). The dichroic coatings can be applied directly to the surface of strobe tubes, another major lighting technology currently used in emergency warning products, or to the surfaces of any other emerging lighting technologies such as LED, HID, neon, etc. Further, as noted elsewhere herein, the dichroic coatings can be applied to an intermediate surface or substrate such as a filter or a sleeve. This intermediate surface or substrate would allow the replacement of the light source without having to also replace the dichroic-coated part.

Since the dichroic coating transmits the desired color, the color of the substrate is irrelevant so long as it also transmits the desired color. Applying the dichroic low-observable technology layer to a white lamp surface such that the resulting transmitted color is blue will yield a similar result to applying the dichroic low-observable technology coating to a conventional blue absorptive filter. The existence of the low-observable technology layer on the exterior surface of the set of parts will not only transmit a resulting blue light but will also hide the color of the substrate and subsequently not reveal what the color of the transmitted light will be, thereby achieving the desired low-observability according to the invention.

Figure 8A:
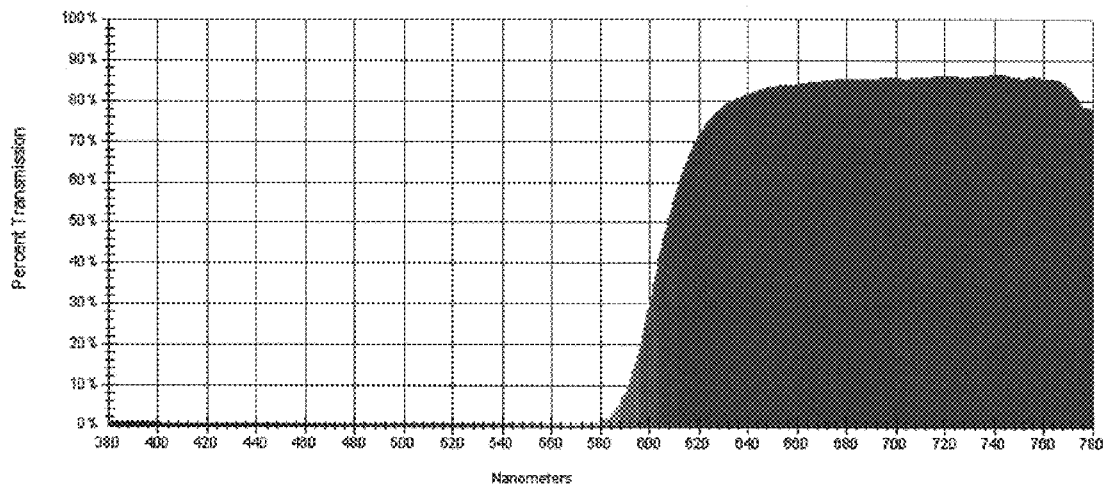
FIG. 8A is a graph of the prior art illustrating the generalized transmission efficiency of a white light source with a red absorptive filter, with percent transmission along the y-axis (vertical) vs. wavelength in nanometers (horizontal).
Figure 8B:
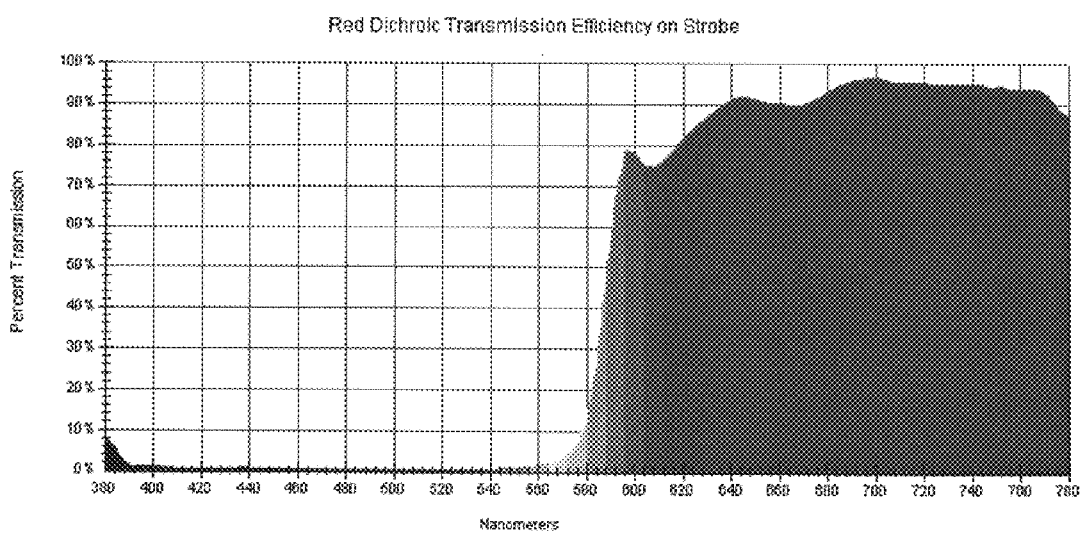
FIG. 8B is a graph of the invention illustrating the transmission efficiency of a white light source with a red-transmitting dichroic coating, with percent transmission along the y-axis (vertical) vs. wavelength in nanometers (horizontal).
Figure 8C:
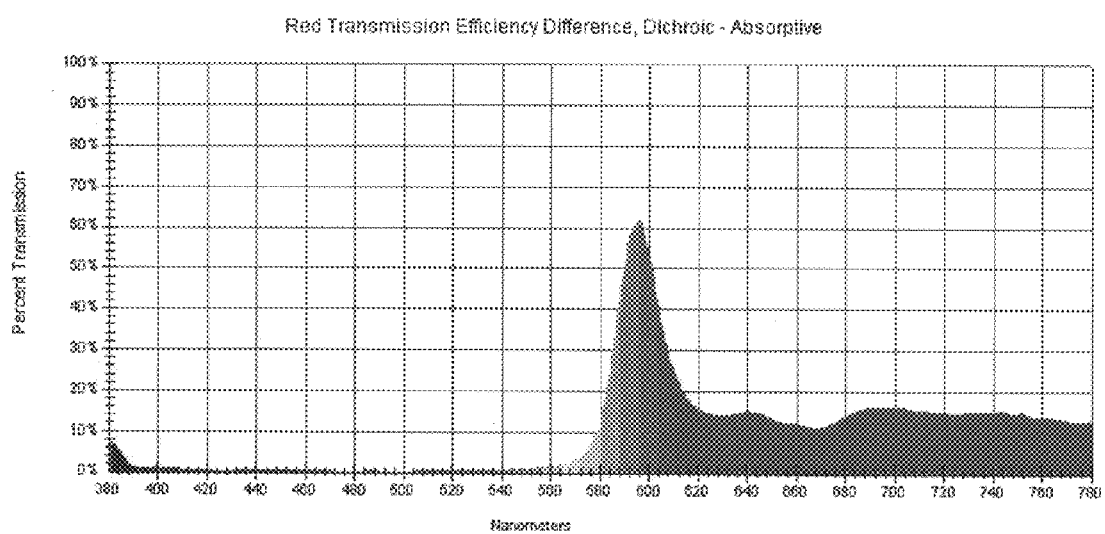
FIG. 8C is a graph illustrating the difference in transmission efficiency between the white light source with a red absorptive filter shown in FIG. 8A and the white light source with a red-transmitting dichroic coating shown in FIG. 8B, with percent transmission along the y-axis (vertical) vs. wavelength in nanometers (horizontal) (e.g., FIG. 8C=FIG. 8B minus FIG. 8A).

In some embodiments of the invention, dichroic coatings are preferred because they are very efficient. Conventional absorptive technology, on the other hand, attenuates a significant portion of the transmitted color range. The spectral radiation charts of FIGS. 8A, 8B and 8C depict characteristic transmission efficiencies for red absorptive and dichroic filters and their difference. The transmission efficiency of a red absorptive filter illustrated in the chart of FIG. 8A shows that about 85% of the red energy is transmitted. In contrast, the transmission efficiency of a red dichroic filter illustrated in the chart of FIG. 8B shows that a dichroic filter transmits about 95% of the red energy available. The difference between the red absorptive and red dichroic filter transmission efficiencies as shown in the chart of FIG. 8C illustrates a performance advantage for the red dichroic filter. This difference translates into a brighter red light. The increased brightness relates to a more noticeable emergency warning signal.

Figure 9A:
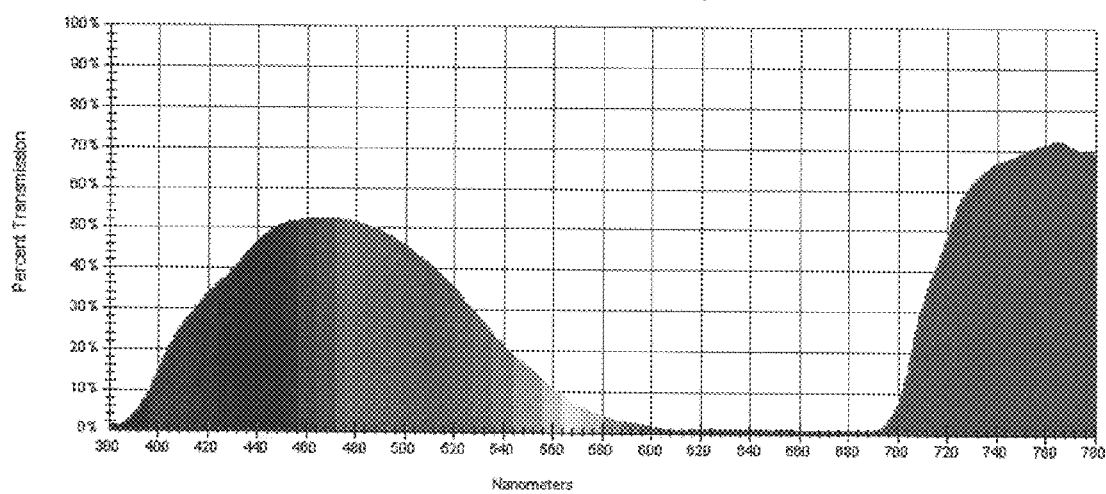
FIG. 9A is a graph of the prior art illustrating the transmission efficiency of a white light source with a blue absorptive filter, with percent transmission along the y-axis (vertical) vs. wavelength in nanometers (horizontal).
Figure 9B:
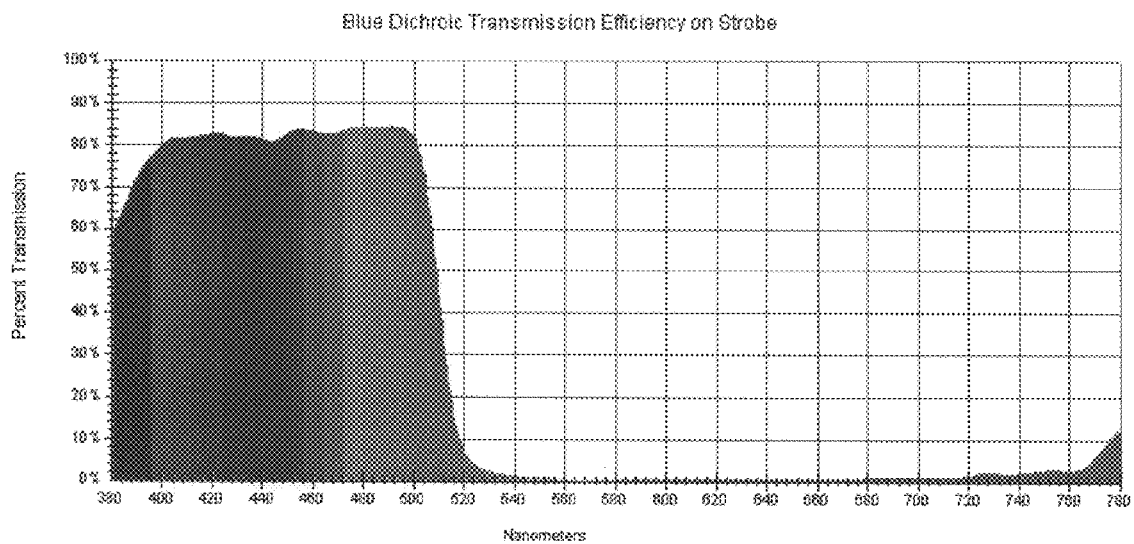
FIG. 9B is a graph of the invention illustrating the transmission efficiency of a white light source with a blue-transmitting dichroic coating, with percent transmission along the y-axis (vertical) vs. wavelength in nanometers (horizontal).
Figure 9C:
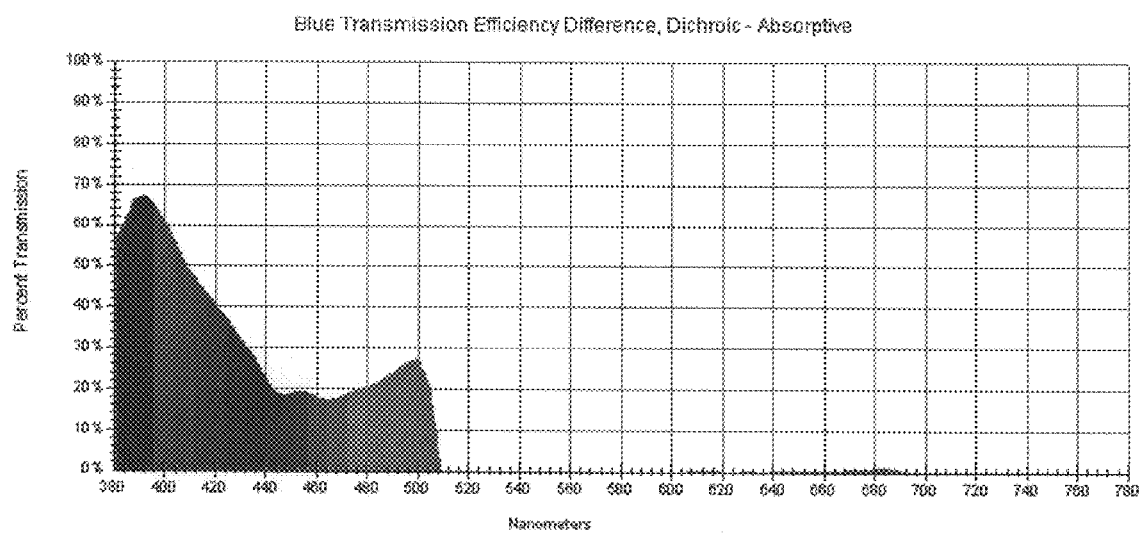
FIG. 9C is a graph illustrating the difference in transmission efficiency between the white light source with a blue absorptive filter shown in FIG. 9A and the white light source with a blue-transmitting dichroic coating shown in FIG. 9B, with percent transmission along the y-axis (vertical) vs. wavelength in nanometers (horizontal) (e.g., FIG. 9C=FIG. 9B minus FIG. 9A).

The advantage of the invention for blue light devices is even more dramatic. The transmission efficiency of a blue absorptive filter as shown in the chart of FIG. 9A reveals significant attenuation of the blue signal. The blue transmission efficiency peaks at about 53% of the available blue energy. The transmission efficiency of a blue dichroic filter as shown in the chart of FIG. 9B shows that a dichroic filter transmits about 83% of the blue energy available. The difference between the blue absorptive and blue dichroic filter transmission efficiencies as shown in the chart of FIG. 9C illustrates a performance advantage for the blue dichroic filter. This difference translates into a brighter blue light. The increased brightness relates to a more noticeable emergency warning signal.

In summary, low-observable technology devices provide a significant benefit to emergency warning lighting. The combination of "low-observability" when un-energized and higher observability when energized provides a significant contrast and one of the broadest ranges of observability characteristics which are desired by public safety officers.

Referring to FIG. 10, a horizontal cross-sectional view of an emergency vehicle warning light device 100 including a visible light source 110, a substrate 120, a transmissive/reflective layer 130 and a collimator 140 according to the invention is illustrated. The device 100 is adapted to be mounted on a vehicle, particularly an emergency vehicle, although it is contemplated that it may be mounted on other vehicles which require light signals to alert observers of their position. Frequently, the device 100 is rotated although that is not a necessary aspect of the invention.

The visible light source 110 is a lamp such as a tungsten or halogen lamp, a high intensity discharge (HID) device, a light emitting diode (LED), a strobe or any other light generating component which is adapted to be mounted on the vehicle. The source 110 generates visible light to be used to create warning signals which are viewed by observers remote from the vehicle carrying the device 100.

The substrate 120 is also adapted to be part of the device and mounted on the vehicle. The substrate 120 has an inner surface 122 and an outer surface 124 which is opposite to and parallel with the inner surface 122. The inner surface 122 is adjacent to the visible light source 110 so that at least some of the visible light generated by the light source 110 is transmitted from the inner surface 122 through the substrate 120 to the outer surface 124. This transmitted light provides a warning light signal when viewed by an observer 150 remote from the vehicle on which the device 110 is mounted. In this device 100, two types of light are transmitted by the substrate 120. Light rays 160 emanating directly from the visible light source 110 pass through the substrate 120 to generate a warning signal viewed by the observer 150. In addition, reflected light rays 170 also pass through the substrate 120. The rays 170 are formed by direct light rays 162 generated by the source 110 and reflected by a collimator 140 to form a beam of light. Although the collimator is an optional aspect of the invention, it is generally part of the device 100. Frequently, the collimator is a parabolic surface and the light source 110 is located at its focal point so that light generated by the light source 110 is formed into a somewhat focused beam aimed at the observer 150. For example, the collimator may be a parabolic surface having a reflective coating 142 thereon.

The transmissive/reflective layer 130 is on the outer surface 124 of the substrate 120. A transmissive/reflective layer 130' on the source 110 may be in place of or in addition to layer 130. For example, if the substrate 120 is clear, a dichroic layer 130' may be applied to source 110. If the source 110 had a visible color (such as red, blue or amber) when not energized, such a layer 130' would be particularly useful to mask the color of the source 110. Thus, layer 130' comprises a transmissive/reflective coating on the light source 110 having an appearance when the light source 110 is not energized of a color substantially different from a color of the visible warning light signals 162 generated by the light source 110 when the visible light source is energized. Layer 130 transmits at least a portion of the light rays 160, 170. In addition, layer 130 reflects rays 180 which constitute certain wavelengths of the ambient light A impinging upon the outer surface 124 of the substrate 120 to change the appearance of the substrate 120 when viewed by the observer 150 remote from the vehicle. In addition, layer 130' reflects rays 180' which constitute certain wavelengths of the ambient light A' impinging upon the layer 130'. This changes the appearance of the light source 110 when viewed by the observer 150 remote from the vehicle when the source is viewed directly or through a clear substrate 120.

Preferably, the layer 130 comprises a dichroic material which transmits a particular range of wavelengths of visible light generated by the source 110 and which reflects as rays 180 certain wavelengths of ambient light A impinging upon the outer surface 124 of the substrate 120. The various, alternative aspects of the transmissive properties of the substrate 120, the transmissive properties of the layer 130 and the reflective properties of the layer 130 will be described in greater detail below. In one preferred embodiment, the substrate 120 is clear and the characteristics of the layer 130 are selected to have transmissive properties to provide warning signals (preferably red, blue or amber signals) and the characteristics of the layer 130 are selected to have reflective properties to mask the device. Optionally, the substrate 120 may be an absorptive filter and/or may include integral optical surfaces 190 which either focus or disperse light which is transmitted through the substrate 120. The integral optics may be on the outer surface of the substrate. The layer 130 may be applied to either surface of the substrate 120 by any conventional or non-conventional techniques such as vapor deposition, adhesion or coating. In the case when layer 130 is dichroic material, the layer 130 is preferably applied to the outer surface 124. In the case when layer 130' is dichroic material, the layer 130' is preferably applied to the outer surface of the source 110.

In the preferred embodiment in which the substrate 120 is an absorptive filter, at least some of the warning signals are colored light. FIG. 11 is a schematic chart illustrating the generalized transmission and reflection characteristics of the substrate 120 and layer 130 according to the invention. In the example illustrated in FIG. 11, it is assumed that the substrate 120 is a blue absorptive filter which transmits some blue light and absorbs all other visible light colors. This transmitted light is indicated by line 202. It is also assumed that the transmissive/reflective layer 130 is a dichroic layer which reflects green and red light and which transmits the blue light transmitted by the substrate 120 and may transmit additional blue light. This transmitted and reflected light is indicated by line 204 of FIG. 11. As a result, the transmitted light beam creating the warning signal corresponds to the blue light transmitted by substrate 120 and indicated by line 202 because all other wavelengths of light are absorbed by the blue filter which forms the substrate 120. As shown in FIG. 11, the wavelengths of light absorbed by the blue filter substrate 120 and indicated by line 202 are within a range which is less than the range of wavelengths transmitted by the dichroic layer 130 and represented by line 204. In this example, the direct light rays 160 and reflected light rays 170 would have a blue color. Thus, a blue warning light signal would be generated. However, when the light source 110 is not illuminated, the ambient light reflected by the layer 130 would be a combination of green and red light as illustrated by line 204 in FIG. 11. This combination of red and green reflected ambient light would appear to the observer to present light other than blue light so that the layer 130 would have a non-blue tone such as a gold tone and would mask the blue color of the substrate 120.

Similarly, if the substrate 120 had a red color (e.g., absorbs light other than red) and if the layer 130 transmits red light and reflects other light of colors other than red, then the layer 130 would appear to the observer to present light other than red light so that the layer 130 would have a non-red tone such as a cyan tone and would mask the red color of the substrate.

Furthermore, it has been observed that the light reflected by the layers has an appearance which depends upon the angle of incidence of ambient light A on the layer 130. For example, when a dichroic coating is used as the layer 130, the layer tends to have a reflective, mirror-like appearance to an observer remote from it. For example, when the dichroic coating transmits blue light, the coating when not transmitting tends to have a gold colored appearance to an observer so that the layer 130 masks the blue color of the substrate. The color of the coating when not transmitting can vary widely depending on such factors as the type of coating, the environmental lighting and the angle of observation. Usually, the substrate 120 is an absorptive filter and therefore has an appearance when not transmitting of the color it transmits. However, it is also contemplated that the substrate 120 may be clear and that the layer 130 may be used to mask it by giving it an appearance which is less apparent. For example, a clear substrate 120 may expose components which are behind it which are visible or may be highly reflective and be visible so that layer 130 would mask the exposed components or the highly reflective nature of the substrate 120.

As a result, the layer 130 according to the invention reduces the appearance of the color of the device to the observer when the light source is inactive (not energized) and not generating visible light which is being transmitted through the substrate and creating warning signals. When the device is inactive and the light source 110 is not illuminated, the reflected ambient light rays 180 presents a different color and/or substantially no color to the observer than the color, if any, of the substrate 120 so that the device 100 is less apparent as an emergency warning device than it would be without the layer 130 in place. This adds to the non-descript nature of the appearance of a light bar having device 100.

By masking the color of the substrate, it is meant that the color being viewed by the observer when the device is not illuminated is different than the color of the substrate or is a color other than an emergency warning color such as red, blue or amber. This provides a particular advantage to certain vehicles which do not want to be obvious or apparent to an observer. For example, many police cars generally use red or blue filters to create emergency warning signals. Such filters are apparent to observers so that observers can readily recognize a police car by the red or blue colors on the police vehicle. On the other hand, according to the invention, such red and blue colors would not be readily apparent because of the layer reflecting the ambient light so that it would not be readily apparent to observers that the vehicle was a police vehicle equipped with an emergency warning device.

In view of the above, it will be seen that the several objects of the invention are achieved and other advantageous results attained.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above products without departing from the scope of the invention, it is intended that all matter contained in the above description and shown in the accompanying drawings shall be interpreted as illustrative and not in a limiting sense.

What is claimed is:

1. An emergency warning device for a vehicle for use with an observer remote from the vehicle for alerting the observer of the vehicle's position, the device comprising:

a visible, colored light source mountable on the vehicle and selectively energizable, the light source when energized generating visible, colored light creating colored warning signals which are viewable by the observer remote from the vehicle for alerting the observer of the vehicle's position;

a transmissive/reflective layer located between the light source and the observer;

wherein, when the light source is energized, at least some of the visible light generated by the light source is transmitted through the layer to the observer;

wherein the transmitted light provides at least one of the colored warning light signals to the observer;

wherein, when the light source is not energized, at least some ambient light impinging upon the layer is reflected by the layer toward the observer; and wherein the color of the transmitted light has a different wavelength range than the color of the reflected ambient light such that the color of the reflected ambient light makes it less apparent that the device generates colored warning signals.

2. The device of claim 1 wherein the layer comprises a dichroic material which transmits a first range of wavelengths of visible light generated by the source and which reflects a second range of wavelengths of visible light impinging upon the outer surface of the layer and wherein the second range is different from the first range.

3. The device of claim 1 further comprising a substrate located between the light source and the observer wherein the transmissive/reflective layer is on the substrate.

4. The device of claim 3 wherein the substrate comprises a sleeve over the light source.

5. The device of claim 3 wherein the substrate includes integral optical surfaces for dispersing or focusing light.

6. The device of claim 3 wherein the layer is applied to the substrate by one of the following techniques: vapor deposition, adhesion, coating.

7. The device of claim 1 further comprising an absorptive filter having inner and outer opposing surfaces, wherein the transmissive/reflective layer is on the outer surface of the filter such that the outer surface of the filter is in contact with the inner surface of the layer, and wherein the inner surface of the filter faces the visible light source so that, when the light source is energized, at least some of the visible light generated by the light source is transmitted from the inner surface through the filter and through the outer surface to the observer so that at least some of the warning signals are colored light.

8. The device of claim 7 wherein the filter includes integral optical surfaces for dispersing or focusing light.

9. The device of claim 7 wherein the wavelengths of light absorbed by the filter are within a range which is less than the particular range of wavelengths transmitted by the layer.

10. The device of claim 7 having at least one of the following:

(a) wherein the filter transmits blue light, wherein the filter has a blue color and wherein the reflected light of the layer presents a non-blue tone to the observer so that the layer masks the blue color of the filter;

(b) wherein the filter transmits red light, wherein the filter has a red color and wherein the reflected light of the layer presents a non-red tone to the observer so that the layer masks the red color of the filter;

(c) wherein the filter transmits amber light, wherein the filter has an amber color and wherein the reflected light of the layer presents a non-amber tone to the observer so that the layer masks the amber color of the filter; and/or (d) wherein the filter transmits green light, wherein the filter has a green color and wherein the reflected light of the layer presents a non-green tone to the observer so that the layer masks the green color of the filter.

11. The device of claim 7 wherein the filter which transmits a colored light and has a color and wherein the layer has a reflective, mirror-like appearance, and/or a gold, silver, blue or purple colored appearance to an observer so that the layer masks the color of the layer.

12. The device of claim 7 wherein the layer is applied to the filter by one of the following techniques: vapor deposition, adhesion, coating.

13. The device of claim 1 wherein the layer is on the light source.

14. The device of claim 1 further comprising a collimator adjacent to the light source for forming a beam of light which is directed through the layer.

15. The device of claim 1 wherein the layer reduces the likelihood of an observer identifying the device as an emergency warning device when the light source is not generating visible light and not transmitting warning signals as compared to the appearance of the color of the device to the observer when the light source is generating visible light and is generating warning light signals so that the device when the light source is not generating visible light is less apparent as an emergency warning device to the observer than the device would be without the layer.

16. The device of claim 1 further comprising:
   a second visible light source mountable on the vehicle and selectively energized, the second light source when energized generating visible light creating warning signals which are viewable by the observer remote from the vehicle for alerting the observer of the vehicle's position;
   a second transmissive/reflective layer located between the second light source and the observer, the layer having inner and outer opposing surfaces; and
   a light bar enclosing the light sources and the layers.

17. The device of claim 16 wherein the layer reduces the likelihood of an observer identifying the device as an emergency warning device when the light source is not generating visible light and not transmitting warning signals as compared to the appearance of the warning colors of the device to the observer when the light source is generating visible light and is generating warning light signals so that the device when the light source is not generating visible light is less apparent as an emergency warning device to the observer than the device would be without the layer.

18. An emergency warning device for a vehicle comprising:
   a visible light source mountable on the vehicle;
   a power supply circuit for selectively energizing the visible light source, the visible light source when energized generating visible warning light signals which are viewable by observers remote from the vehicle for alerting the observers of the vehicle's position;
   a transmissive/reflective layer located between the light source and the observer, the layer transmitting warning light signals of a first color to the observer when the light source is energized, and the layer reflecting ambient light of a second color when the light source is not energized, wherein the second color is different than the first color so that the layer has an appearance when the light source is not energized which is different from the warning light signals.

19. An emergency warning device for a vehicle comprising:
   a visible light source mountable on the vehicle;
   a power supply circuit for energizing the visible light source, the visible light source when energized generating visible warning light signals which are viewable by observers remote from the vehicle for alerting the observers of the vehicle's position; and
   a transmissive/reflective layer positioned on the vehicle between the light source and the observer having an appearance when the light source is not energized of a color substantially different from a color of the visible warning light signals generated by the light source and transmitted through the layer when the light source is energized.

20. The device of claim 19 wherein the layer comprises a dichroic material which transmits a first range of wavelengths of visible light generated by the light source and which reflects a second range of wavelengths of visible light impinging upon the outer surface of the layer and wherein the second range is different from the first range.

21. The device of claim 20 having at least one of the following:
   (a) the layer transmits blue light and the layer appears to have a non-blue tone to the observer;
   (b) the layer transmits red light and the layer appears to have a non-red tone to the observer;
   (c) the layer transmits amber light and the layer appears to have a non-amber tone to the observer;
   (d) the layer transmits green light and the layer appears to have a non-green tone to the observer.

22. The device of claim 19 wherein the layer has a reflective, mirror-like appearance, and/or a gold, silver, blue or purple colored appearance to the observer.

23. An emergency warning device for a vehicle for use with an observer remote from the vehicle for alerting the observer of the vehicle's position, the device comprising:
   a visible light source mountable on the vehicle and selectively energized, the light source when energized generating visible light creating warning signals which are viewable by the observer remote from the vehicle for alerting the observer of the vehicle's position;
   a transmissive/reflective layer located between the light source and the observer;
   wherein, when the light source is energized, at least some of the visible light generated by the light source is transmitted through the layer to the observer;
   wherein the transmitted light provides at least one of the warning light signals to the observer and presents a first image of the layer when viewed by the observer;
   wherein, when the light source is not energized, at least some ambient light impinging upon the layer is reflected by the layer toward the observer;
   wherein the reflected light presents a second image of the layer when viewed by the observer; and
   wherein the transmissive/reflective layer is transmitting and reflecting light such that the second image of the layer (which is the image of the layer viewed by the observer when the light source is not energized) has less apparent warning colors to the observer than the first image of the layer (which is the image of the layer viewed by the observer when the light source is energized).

24. The device of claim 23 wherein the color of the transmitted light has a different wavelength range than the color of the reflected light such that the color of the reflected light is less apparently a warning color to the observer than the color of the transmitted light.

25. An emergency warning device for a vehicle for use with an observer remote from the vehicle for alerting the observer of the vehicle's position, the device comprising:
- a visible light source mountable on the vehicle and selectively energized, the light source when energized generating visible light creating warning signals which are viewable by the observer remote from the vehicle for alerting the observer of the vehicle's position;
- a transmissive/reflective layer located between the light source and the observer;
- wherein, when the light source is energized, at least some of the visible light generated by the light source is transmitted through the layer to the observer;
- wherein the transmitted light provides at least one of the colored warning light signals to the observer;
- wherein, when the light source is not energized, at least some ambient light impinging upon the layer is reflected by the layer toward the observer; and
- wherein the transmissive/reflective layer is transmitting and reflecting light such that the color image which would be viewed by the observer of the device when the light source is not energized is less apparently a warning color to the observer as compared to the colored image which would be viewed by the observer of the device without the layer.

26. A light bar for use with a vehicle for use with an observer remote from the vehicle for alerting the observer of the vehicle's position, comprising:
- an enclosure;
- mounting hardware for securing the enclosure to the vehicle; and two or more devices within the enclosure, each device comprising:
  - a light source which is selectively energized;
  - a reflector positioned adjacent the light source for forming a beam of light; and
  - a transmissive/reflective layer positioned between the reflector and the observer to intersect the beam wherein the transmissive/reflective layer is transmitting the beam and reflecting ambient light such that the colored image which would be viewed by the observer of the device when the light source is not energized is less apparently a warning color to the observer as compared to the colored image which would be viewed by the observer of the device when the light source is not energized.

* * * * *